US012726394B2

(12) United States Patent
Cho

(10) Patent No.: US 12,726,394 B2
(45) Date of Patent: Sep. 1, 2026

(54) TRANSMITTER USING PI/2-PULSE AMPLITUDE MODULATION SYMBOL AND SPECTRUM SHAPING

(71) Applicant: Samsung Electronics Co., Ltd., Suwon-si (KR)

(72) Inventor: Joon Ho Cho, Pohang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 329 days.

(21) Appl. No.: 18/696,906

(22) PCT Filed: Oct. 1, 2021

(86) PCT No.: PCT/KR2021/013496
§ 371 (c)(1),
(2) Date: Mar. 28, 2024

(87) PCT Pub. No.: WO2023/054771
PCT Pub. Date: Apr. 6, 2023

(65) Prior Publication Data
US 2024/0414042 A1 Dec. 12, 2024

(51) Int. Cl.
*H04L 27/26* (2006.01)
*H04L 5/00* (2006.01)

(52) U.S. Cl.
CPC ........ *H04L 27/2636* (2013.01); *H04L 5/0007* (2013.01); *H04L 5/003* (2013.01)

(58) Field of Classification Search
CPC ... H04L 27/2636; H04L 5/0007; H04L 5/003; H04L 25/03828; H04L 27/26362;
(Continued)

(56) References Cited

U.S. PATENT DOCUMENTS

2016/0112238 A1 4/2016 Ling et al.
2016/0164613 A1* 6/2016 Menezo ............ H04B 10/5161 398/115

(Continued)

FOREIGN PATENT DOCUMENTS

KR 10-2021-0113411 A 9/2021
WO 2021027901 A1 2/2021
WO 2021054765 A1 3/2021

OTHER PUBLICATIONS

International Search Report and Written Opinion of the International Searching Authority dated Jun. 17, 2022, in connection with International Application No. PCT/KR2021/013496, 12 pages.

(Continued)

*Primary Examiner* — Afshawn M Towfighi

(57) ABSTRACT

Provided are a DFT-spread OFDM transmitter and transmission method and a DFT-spread OFDM receiver and reception method capable of receiving the transmitted signal with a frequency domain spectrum shaping vector designed to easily trade off PAPR for spectral efficiency without inter-symbol interference, the DFT-spread OFDM transmitter including a phase shifter for generating a pi/2 PAM symbol vector by phase-shifting a symbol vector including M PAM symbols, a DFT spreader for generating a DFT-spread pi/2 PAM symbol vector by spreading the pi/2 PAM symbol vector using an M-point DFT matrix, a frequency domain spectrum shaper for generating a frequency domain spectrum shaped pi/2 PAM symbol vector by multiplying each element of the DFT-spread pi/2 PAM symbol vector by each element of a first shaping vector including one or more zero (0) elements, and a sub-carrier allocator for allocating a non-zero element in the frequency domain spectrum shaped pi/2 PAM symbol vector to a sub-carrier in an allocated frequency range.

14 Claims, 9 Drawing Sheets

(58) Field of Classification Search
CPC ......... H04L 27/26412; H04L 25/03159; H04L 25/03343; H04L 27/2614; H04L 27/34; H04L 27/26; H04L 27/2634
See application file for complete search history.

(56) References Cited

U.S. PATENT DOCUMENTS

2016/0218811 A1* 7/2016 Chen .................... H04B 10/541
2018/0262274 A1 9/2018 Yu et al.
2021/0111938 A1* 4/2021 Sahin .................. H04L 27/2626
2022/0052894 A1 2/2022 Cha et al.
2022/0377737 A1 11/2022 Yoon et al.
2024/0414042 A1* 12/2024 Cho ........................ H04L 27/26

OTHER PUBLICATIONS

Choi, et al., "Widely-Linear Nyquist Criteria for DFT-Spread OFDM of Constellation-Rotated PAM Symbols," IEEE Transactions on Communications vol. 69, Issue 5, Feb. 2021, 15 pages.
Supplementary European Search Report dated Sep. 24, 2024, in connection with European Application No. 21959542.8, 11 pages.
Nokia, et al., "On PI/2 PBSK spectrum shaping," R4-1711208, 3GPP TSG-RAN WG4 #84Bis, Dubrovnik, Croatia, Oct. 9-13, 2017, 8 pages.

* cited by examiner

TRANSMITTER USING PI/2-PULSE AMPLITUDE MODULATION SYMBOL AND SPECTRUM SHAPING

TECHNICAL FIELD

The disclosure relates to signal transmission and reception using pi/2 pulse amplitude modulation (PAM) symbols and spectrum shaping (frequency domain spectrum shaping (FDSS)) in a communication system.

BACKGROUND ART

In fourth generation (4G) mobile communication, discrete Fourier transform (DFT)-spread orthogonal frequency division multiplexing (OFDM), which is a type of localized single-carrier frequency domain multiple access (SC-FDMA), was adopted to attain a low uplink (UL) peak-to-average power ratio (PAPR). Low PAPR performance increases power amplifier efficiency of user equipment and provides wider cell coverage.

Fifth generation (5G) mobile communication adopted not only orthogonal frequency division multiple access (OFDMA) for UL but also the traditional DFT-spread OFDM for low PAPR performance. Especially, as compared to 4G mobile communication, the DFT-spread OFDM adopted in 5G mobile communication supports pi/2 binary phase shift keying (BPSK) symbols and frequency domain spectrum shaping (FDSS) to further enhance the PAPR performance.

However, using the pi/2 BPSK symbol halves spectral efficiency as compared to the traditional QPSK symbol, and consequently, PAPR performance is enhanced by sacrificing the spectral efficiency. In other words, there is commonly a trade-off between the PAPR and the spectral efficiency, and the 5G mobile communication has not provided a spectral efficiency value between pi/2 BPSK and QPSK. Furthermore, traditional technologies have not provided a method of transmitting pi/2 pulse amplitude modulation (PAM) symbols resulting from normalizing pi/2 BPSK. In related prior art literature, disclosed is getting a similar effect to what is mentioned above by using additional constellation rotation and spectrum shaping for pi/2 PAM symbols, but when mobile communication beyond sixth generation (6G) follows a method of transmitting pi/2 BPSK symbols without additional constellation rotation or a method of transmitting pi/2 PAM obtained by normalizing the pi/2 BPSK symbol without additional constellation rotation as in 4G and 5G, there is a need to design a new shaping vector. Accordingly, when the pi/2 PAM symbol is transmitted without additional constellation rotation, the disclosure that properly trades off PAPR against spectral efficiency is required.

PRIOR ART LITERATURE (Non-patent literature) J. Choi, J. Kim, J. H. Cho and J. S. Lehnert, "Widely-Linear Nyquist Criteria for DFT-Spread OFDM of Constellation-Rotated PAM Symbols," in IEEE Transactions on Communications, vol. 69, no. 5, pp. 2909-2922 May 2021, doi: 10.1109/TCOMM.2021.3056106.

DISCLOSURE

Technical Problem

An objective of the disclosure is to provide a discrete Fourier transform (DFT)-spread orthogonal frequency division multiplexing (OFDM) transmitter and transmitting method which designs a frequency domain spectrum shaping vector to have an easy trade-off between a peak-to-average power ratio (PAPR) and spectral efficiency without pi/2 pulse amplitude modulation (PAM) inter-symbol interference and additional constellation rotation, and a DFT-spread OFDM receiver and receiving method which may receive the signal from the transmitter.

However, the objective of the disclosure is not limited thereto, but may be extended in various ways without departing from spirit and scope of the disclosure.

Technical Solution

According to an embodiment of the disclosure, a discrete Fourier transform (DFT)-spread orthogonal frequency division multiplexing (OFDM) transmitter includes a phase shifter configured to generate a pi/2 pulse amplitude modulation (PAM) symbol vector d by phase-shifting a symbol vector b including M PAM symbols, a DFT spreader configured to generate a DFT-spread pi/2 PAM symbol vector c by spreading the pi/2 PAM symbol vector d by using an M-point DFT matrix $W_M$, a frequency domain spectrum shaper configured to generate a frequency domain spectrum shaped pi/2 PAM symbol vector a by multiplying each element of the DFT-spread pi/2 PAM symbol vector c by each element of a first shaping vector $s_T$ including one or more zero (0) elements, and a sub-carrier allocator configured to allocate a non-zero element in the frequency domain spectrum shaped pi/2 PAM symbol vector a to a sub-carrier in an allocated frequency range.

According to an aspect, the frequency domain spectrum shaper may be configured to generate the frequency domain spectrum shaped pi/2 PAM symbol vector a by performing Hadamard product of the DFT-spread pi/2 PAM symbol vector c and the first shaping vector $s_T$, wherein the first shaping vector $s_T$ may be determined according to M and L, the number of sub-carriers to be used.

According to an aspect, an m-th element of the first shaping vector $s_T$ may be defined by the following equation:

$$s_{T,m} \triangleq \begin{cases} 0, & \text{for } 1 \le m \le \frac{M-L+1}{2}, \\ \sqrt{2}\sin\left(\frac{\pi\left(m - \frac{M-L+1}{2}\right)}{2L-M+2}\right), & \text{for } \frac{M-L+1}{2} < m \le \frac{L+3}{2}, \\ \sqrt{2}, & \text{for } \frac{L+3}{2} \le m \le \frac{2M-L+1}{2}, \\ \sqrt{2}\cos\left(\frac{\pi\left(m - \frac{2M-L+1}{2}\right)}{2L-M+2}\right), & \text{for } \frac{2M-L+1}{2} < m \le \frac{M+L+1}{2}, \\ 0, & \text{for } \frac{M+L+1}{2} < m \le M, \end{cases}$$

where m=1, 2, . . . , M, M may be an even number, L may be an odd number, and M/2<L<M.

According to an aspect, the frequency domain spectrum shaper may be configured to perform frequency domain spectrum shaping with a second shaping vector $s_{T2}$ generated by performing Hadamard product of the first shaping vector $s_T$ and a window vector W of one of Hamming, Hanning, Keiser, Gaussian, Tukey, Blackmann and Dolph-Chebyshev.

According to another embodiment of the disclosure, a discrete Fourier transform (DFT)-spread orthogonal frequency division multiplexing (OFDM) transmission method performed by a DFT-spread OFDM transmitter includes generating a pi/2 pulse amplitude modulation (PAM) symbol vector d by phase-shifting a symbol vector b including M PAM symbols, generating a DFT-spread pi/2 PAM symbol vector c by spreading the pi/2 PAM symbol vector d by using an M-point DFT matrix $W_M$, generating a frequency domain spectrum shaped pi/2 PAM symbol vector a by multiplying each element of the DFT-spread pi/2 PAM symbol vector c by each element of a first shaping vector $s_T$ including one or more zero (0) elements, and allocating a non-zero element in the frequency domain spectrum shaped pi/2 PAM symbol vector a to a sub-carrier in an allocated frequency range.

According to an aspect, the generating of the frequency domain spectrum shaped pi/2 PAM symbol vector a may include generating the frequency domain spectrum shaped pi/2 PAM symbol vector a by performing Hadamard product of the DFT-spread pi/2 PAM symbol vector c and the first shaping vector $s_T$, wherein the first shaping vector $s_T$ may be determined according to M and L, the number of sub-carriers to be used.

According to an aspect, an m-th element of the first shaping vector $s_T$ may be defined by the following equation:

$$s_{T,m} \triangleq \begin{cases} 0, & \text{for } 1 \le m \le \frac{M-L+1}{2}, \\ \sqrt{2}\sin\left(\frac{\pi\left(m-\frac{M-L+1}{2}\right)}{2L-M+2}\right), & \text{for } \frac{M-L+1}{2} < m \le \frac{L+3}{2}, \\ \sqrt{2}, & \text{for } \frac{L+3}{2} \le m \le \frac{2M-L+1}{2}, \\ \sqrt{2}\cos\left(\frac{\pi\left(m-\frac{2M-L+1}{2}\right)}{2L-M+2}\right), & \text{for } \frac{2M-L+1}{2} < m \le \frac{M+L+1}{2}, \\ 0, & \text{for } \frac{M+L+1}{2} < m \le M, \end{cases}$$

where m=1, 2, . . . , M, M may be an even number, L may be an odd number, and M/2<L<M.

According to an aspect, the generating of the frequency domain spectrum shaped pi/2 PAM symbol vector a may include performing frequency domain spectrum shaping with a second shaping vector $s_{T2}$ generated by performing Hadamard product of the first shaping vector $s_T$ and a window vector w of one of Hamming, Hanning, Keiser, Gaussian, Tukey, Blackmann and Dolph-Chebyshev.

According to another embodiment of the disclosure, a discrete Fourier transform (DFT)-spread orthogonal frequency division multiplexing (OFDM) receiver includes a cyclic prefix remover configured to generate a vector $\tilde{y}$ with cyclic prefix (CP) removed therefrom by receiving a signal y which has passed through a channel and removing the CP from the signal y, an N-point DFT module configured to generate a frequency domain receive vector by performing N-point DFT on the vector $\tilde{y}$ with the cyclic prefix removed therefrom, a sub-carrier selection and zero padding module configured to generate a vector $\hat{a}$ having a length of M by selecting a portion corresponding to a sub-carrier in an allocated frequency range from among the frequency domain receive vector to generate a vector $\tilde{a}$ having a length of L and then performing zero padding on the vector $\tilde{a}$, a frequency domain receive spectrum shaper configured to generate a frequency domain receive spectrum shaped vector $\hat{c}$ having a length of M by performing Hadamard product of the zero-padded vector a and a conjugate complex vector of a receive shaping vector $s_R$, an inverse DFT (IDFT) module configured to generate a de-spread vector $\hat{d}$ by multiplying the frequency domain receive spectrum shaped vector $\hat{c}$ by a transverse DFT matrix $$W_M^H,$$

an inverse phase shifter configured to generate an inverse-phase-shifted vector $\tilde{b}$ by multiplying the de-spread vector $\hat{d}$ by a transverse phase shift matrix $F^H$, and an imaginary part eliminator configured to generate an estimated value $\hat{b}$ of a transmitted PAM symbol vector by taking real parts of the inverse-phase-shifted vector $\tilde{b}$.

According to an aspect, the zero padding may be performed by adding (M−L+1)/2 zeros (0's) in front of the vector $\tilde{a}$ and (M−L−1)/2 zeros behind.

According to an aspect, the frequency domain receive spectrum shaper may be configured to perform frequency domain receive spectrum shaping by using a third shaping vector $s_{T3}$ generated by performing Hadamard product of a first shaping vector $s_T$ including one or more zero elements and a channel equalization vector v.

According to another embodiment of the disclosure, a discrete Fourier transform (DFT)-spread orthogonal frequency division multiplexing (OFDM) reception method performed by a DFT-spread OFDM receiver includes generating a vector $\tilde{y}$ with cyclic prefix (CP) removed therefrom by receiving a signal y which has passed through a channel and removing the CP from the signal y, generating a frequency domain receive vector by performing N-point DFT on the vector $\tilde{y}$ with the cyclic prefix removed therefrom, generating a vector $\tilde{a}$ by selecting a part corresponding to a sub-carrier in an allocated frequency range from among the frequency domain receive vector, and performing zero padding on the vector $\tilde{a}$, generating a frequency domain receive spectrum shaped vector $\hat{c}$ by performing Hadamard product of the zero-padded vector $\hat{a}$ and a conjugate complex vector of a receive shaping vector $s_R$, generating a de-spread vector $\hat{d}$ by multiplying the frequency domain receive spectrum shaped vector $\hat{c}$ by a transverse DFT matrix $$W_M^H,$$

generating an inverse-phase-shifted vector $\tilde{b}$ by multiplying the de-spread vector $\hat{d}$ by a transverse phase shift matrix $F^H$, and generating an estimated value $\hat{b}$ of a transmitted PAM symbol vector by taking real parts of the inverse-phase-shifted vector $\tilde{b}$.

According to an aspect, the zero padding may be performed by adding (M−L+1)/2 zeros (0's) in front of the vector $\tilde{a}$ and (M−L−1)/2 zeros behind.

According to an aspect, the generating of the frequency domain receive spectrum shaped vector $\hat{c}$ may include performing frequency domain receive spectrum shaping by using a third shaping vector $s_{T3}$ generated by performing Hadamard product of a first shaping vector $s_T$ including one or more zero elements and a channel equalization vector v.

Advantageous Effects

The disclosure may have the following technological effects. However, it does not mean that a certain embodiment should have all or only the following effects, so the technological scope of rights of the disclosure should not be understood as being limited thereto.

According to a discrete Fourier transform (DFT)-spread orthogonal frequency division multiplexing (OFDM) transmitter and transmission method and a DFT-spread OFDM receiver and reception method capable of receiving the transmitted signal in the aforementioned embodiments of the disclosure, a frequency domain spectrum shaping vector may be designed to easily trade off peak-to-average power ratio (PAPR) against spectral efficiency without pi/2 PAM inter-symbol interference and additional constellation rotation.

MODE FOR INVENTION

Various modifications may be made to embodiments of the disclosure, which will be described more fully hereinafter with reference to the accompanying drawings.

The disclosure should be understood as not limited to particular embodiments but including all the modifications, equivalents and replacements which belong to technical scope and ideas of the disclosure.

Terms like 'first', 'second', etc., may be used to indicate various components, but the components should not be restricted by the terms. These terms are only used to distinguish one element, component, region, layer or section from another region, layer or section. For example, the first component may be termed as the second component, and vice versa, within the scope of the disclosure.

An expression of "A is connected or linked to B" should be understood as A being connected or linked to B directly or via C in between. However, when it is mentioned that A is directly connected or linked to B, it should be understood that there is nothing between A and B.

The terminology used herein is for the purpose of describing particular embodiments only and is not intended to limit the disclosure. It is to be understood that the singular forms "a," "an," and "the" include plural references unless the context clearly dictates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by those of ordinary skill in the art to which the disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the disclosure will now be described clearly and in detail for those of ordinary skill in the art to which the disclosure belongs to easily practice them with reference to accompanying drawings.

Figure 1:
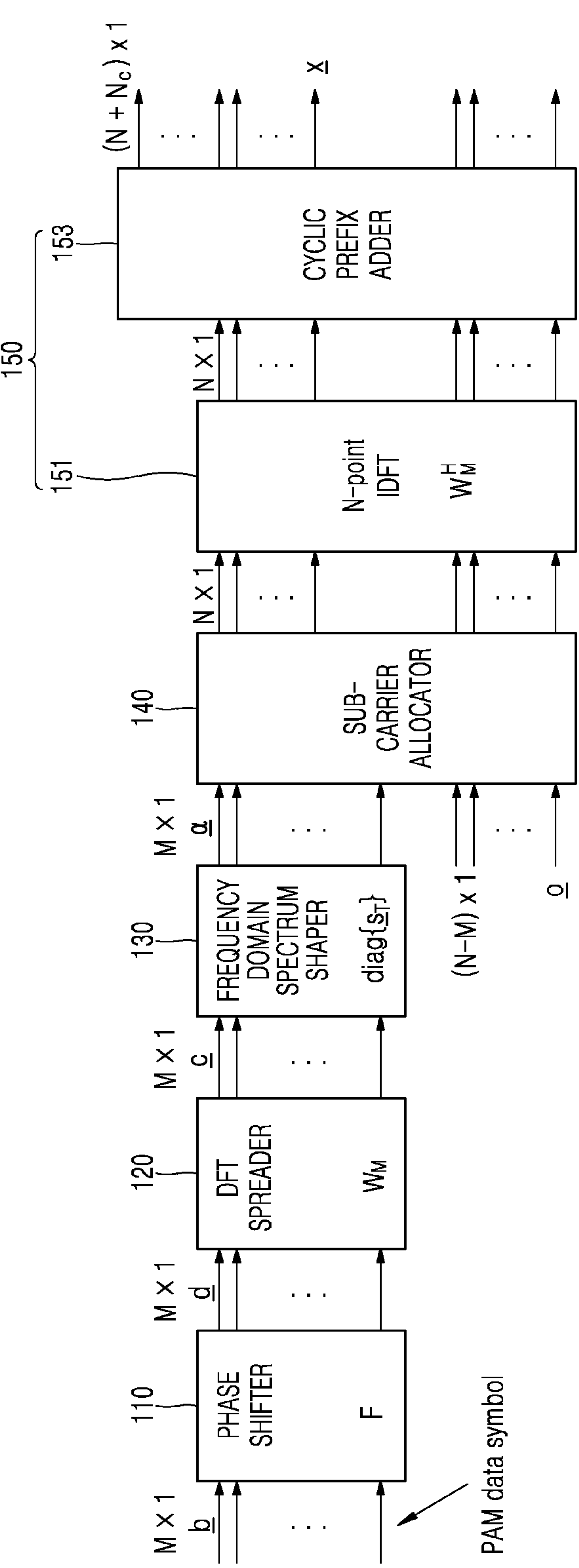
FIG. 1 is a block diagram illustrating a configuration of a discrete Fourier transform (DFT)-spread orthogonal frequency division multiplexing (OFDM) transmitter, according to an embodiment of the disclosure.
Figure 2:
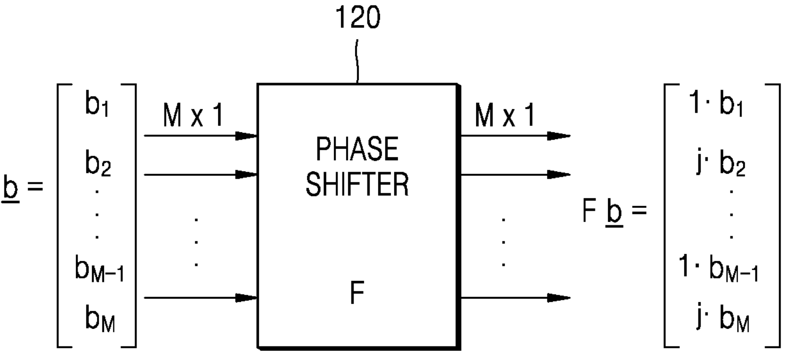
FIG. 2 is a block diagram illustrating a phase shifter of FIG. 1 in detail.
Figure 3:
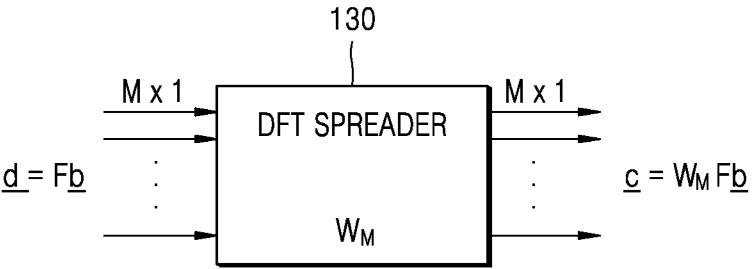
FIG. 3 is a block diagram illustrating a DFT spreader of FIG. 1 in detail.
Figure 4:
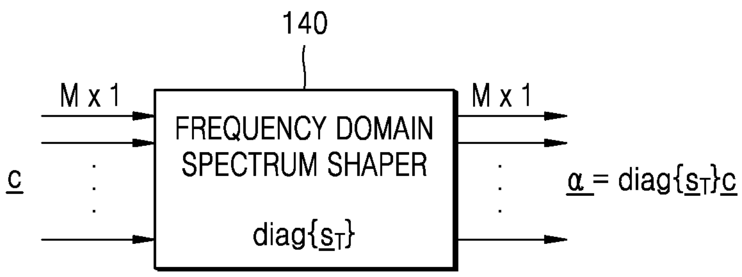
FIG. 4 is a block diagram illustrating a frequency domain spectrum shaper of FIG. 1 in detail.

FIG. 1 is a block diagram illustrating a configuration of a discrete Fourier transform (DFT)-spread orthogonal frequency division multiplexing (OFDM) transmitter, according to an embodiment of the disclosure, FIG. 2 is a block diagram illustrating a phase shifter of FIG. 1 in detail, FIG. 3 is a block diagram illustrating a DFT spreader of FIG. 1 in detail, and FIG. 4 is a block diagram illustrating a frequency domain spectrum shaper of FIG. 1 in detail.

Referring to FIG. 1, a DFT-spread OFDM transmitter 100 according to an embodiment of the disclosure may include a phase shifter 110, a DFT spreader 120, a frequency domain spectrum shaper 130, a sub-carrier allocator 140 and a signal generator 150. The signal generator 150 may include an N-point inverse DFT (IDFT) module 151 and a cyclic prefix adder 153.

The phase shifter 110 generates a pi/2 pulse amplitude modulation (PAM) symbol vector by phase-shifting a symbol vector b including M PAM symbols. M refers to an even number. As shown in FIG. 2, the pi/2 PAM symbol vector d may be generated by d=Fb, and the phase-shifted matrix F, which is a diagonal matrix, may be defined by equation 1:

$$F \triangleq \text{diag}\{[1, j, 1, j, \ldots]\} \quad \text{[Equation 1]}$$

where j is a square root of −1 and should not be mixed up with index j included in equations below. The phase-shifted matrix F does not have to have only 1's and j's as diagonal elements as long as an l-th diagonal element and (l+1)-th diagonal element hold a phase difference of +90° or −90°. The phase shift may be performed by performing Hadamard product of a vector having the diagonal elements of the diagonal matrix F as elements and a symbol vector b.

The DFT spreader 120 generates a DFT-spread pi/2 PAM symbol vector c by spreading the pi/2 PAM symbol vector d by using a DFT matrix $W_M$. As shown in FIG. 3, the DFT-spread pi/2 PAM symbol vector c may be generated by $c=W_M Fb$, and in this case, element (i, j) of the DFT matrix $W_M$ may be determined by equation 2:

$$[W_M]_{(i,j)} = \frac{1}{\sqrt{M}} e^{-j\frac{2\pi}{M}(i-1)(j-1)} \quad \text{[Equation 2]}$$

In equation 2, the indexes i and j satisfy the terms of 1≤i≤M and 1≤j≤M, respectively.

The frequency domain spectrum shaper 130 generates a frequency domain spectrum shaped pi/2 PAM symbol vector a by multiplying the DFT-spread pi/2 PAM symbol vector c by each element of a first shaping vector $s_T$ including one or more zero (0) elements. Alternatively, as shown in FIG. 4, the frequency domain spectrum shaped pi/2 PAM symbol vector a may be generated by performing Hadamard product of the DFT-spread pi/2 PAM symbol vector C and the first shaping vector $s_T$ or by multiplying the DFT-spread pi/2 PAM symbol vector c by a matrix diag{$s_T$} having the first shaping vector $s_T$ as diagonal elements. The first shaping vector $s_T$ having (M×1) dimension may be defined by equation 3:

$$\underline{s}_T = [s_{T,1}, s_{T,2}, \cdots, s_{T,M}]^T \quad \text{[Equation 3]}$$

Each element of the first shaping vector $s_T$ may be determined according to length M of the symbol vector b and the number L of allocated sub-carriers. L is an odd number. Specifically, the m-th element of the first shaping vector $s_T$ may be determined by equation 4:

[Equation 4]

$$s_{T,m} \triangleq \begin{cases} 0, & \text{for } 1 \le m \le \frac{M-L+1}{2}, \\ \sqrt{2}\sin\left(\frac{\pi\left(m - \frac{M-L+1}{2}\right)}{2L-M+2}\right), & \text{for } \frac{M-L+1}{2} < m \le \frac{L+3}{2}, \\ \sqrt{2}, & \text{for } \frac{L+3}{2} \le m \le \frac{2M-L+1}{2}, \\ \sqrt{2}\cos\left(\frac{\pi\left(m - \frac{2M-L+1}{2}\right)}{2L-M+2}\right), & \text{for } \frac{2M-L+1}{2} < m \le \frac{M+L+1}{2}, \\ 0, & \text{for } \frac{M+L+1}{2} < m \le M, \end{cases}$$

In equation 4, m is 1, 2, . . . , M and satisfies M/2<L<M. The frequency domain spectrum shaper 130 may perform frequency domain spectrum shaping with a second shaping vector $s_{T2}$ generated by performing Hadamard product of the first shaping vector $s_T$ and a window vector w of one of Hamming, Hanning, Keiser, Gaussian, Tukey, Blackmann and Dolph-Chebyshev.

The sub-carrier allocator 140 allocates L non-zero elements in the frequency domain spectrum shaped pi/2 PAM symbol vector a to a sub-carrier in an allocated frequency range. Once the frequency domain spectrum shaped pi/2 PAM symbol vector a is allocated to the sub-carrier, a DFT-spread OFDM signal x is generated through the N-point IDFT module 151 and the cyclic prefix adder 153. Operations of the N-point IDFT 151 and the cyclic prefix adder 153 are widely known technologies in the art to which the disclosure belongs, so the description thereof will be omitted in the specification.

Figure 5:
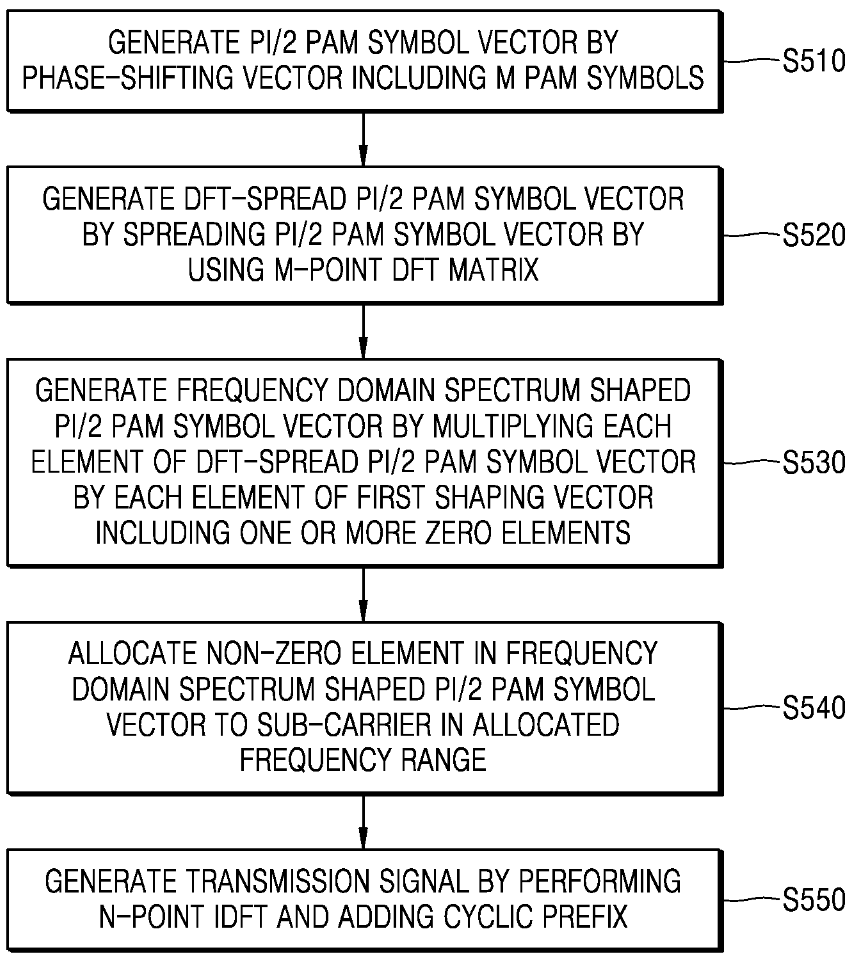
FIG. 5 is a flowchart of a DFT-spread OFDM transmission method, according to an embodiment of the disclosure.

FIG. 5 is a flowchart of a DFT-spread OFDM transmission method, according to an embodiment of the disclosure.

The DFT-spread OFDM transmission method according to an embodiment of the disclosure may be performed by the DFT-spread OFDM transmitter 100 of FIG. 1.

Referring to FIG. 5, in operation S510, a pi/2 PAM symbol vector d is generated by phase-shifting a symbol vector b including M PAM symbols. M refers to an even number. In this case, the pi/2 PAM symbol vector & may be generated by d=Fb, and the phase-shifted matrix, which is a diagonal matrix, may be defined by equation 1.

In operation S520, a DFT-spread pi/2 PAM symbol vector c is generated by spreading the pi/2 PAM symbol vector d by using a DFT matrix $W_M$. In this case, element (i, j) of the DFT matrix $W_M$ may be determined by equation 2.

In operation S530, a frequency domain spectrum shaped pi/2 PAM symbol vector a is generated by multiplying the DFT-spread pi/2 PAM symbol vector c by each element of the first shaping vector $s_T$ including one or more zero (0) elements. Alternatively, the frequency domain spectrum shaped pi/2 PAM symbol vector a may be generated by performing Hadamard product of the DFT-spread pi/2 PAM symbol vector c and the first shaping vector $s_T$ or by multiplying the DFT-spread pi/2 PAM symbol vector & by a matrix having the first shaping vector diag{$s_T$} as diagonal elements. In this case, the m-th element of the first shaping vector $s_T$ may be determined by equation 4.

In operation S540, L non-zero elements in the frequency domain spectrum shaped pi/2 PAM symbol vector a are allocated to a sub-carrier in an allocated frequency range.

In operation S550, once the frequency domain spectrum shaped pi/2 PAM symbol vector a is allocated to the sub-carrier, a signal is generated by performing N-point IDFT and adding cyclic prefix.

Figure 6:
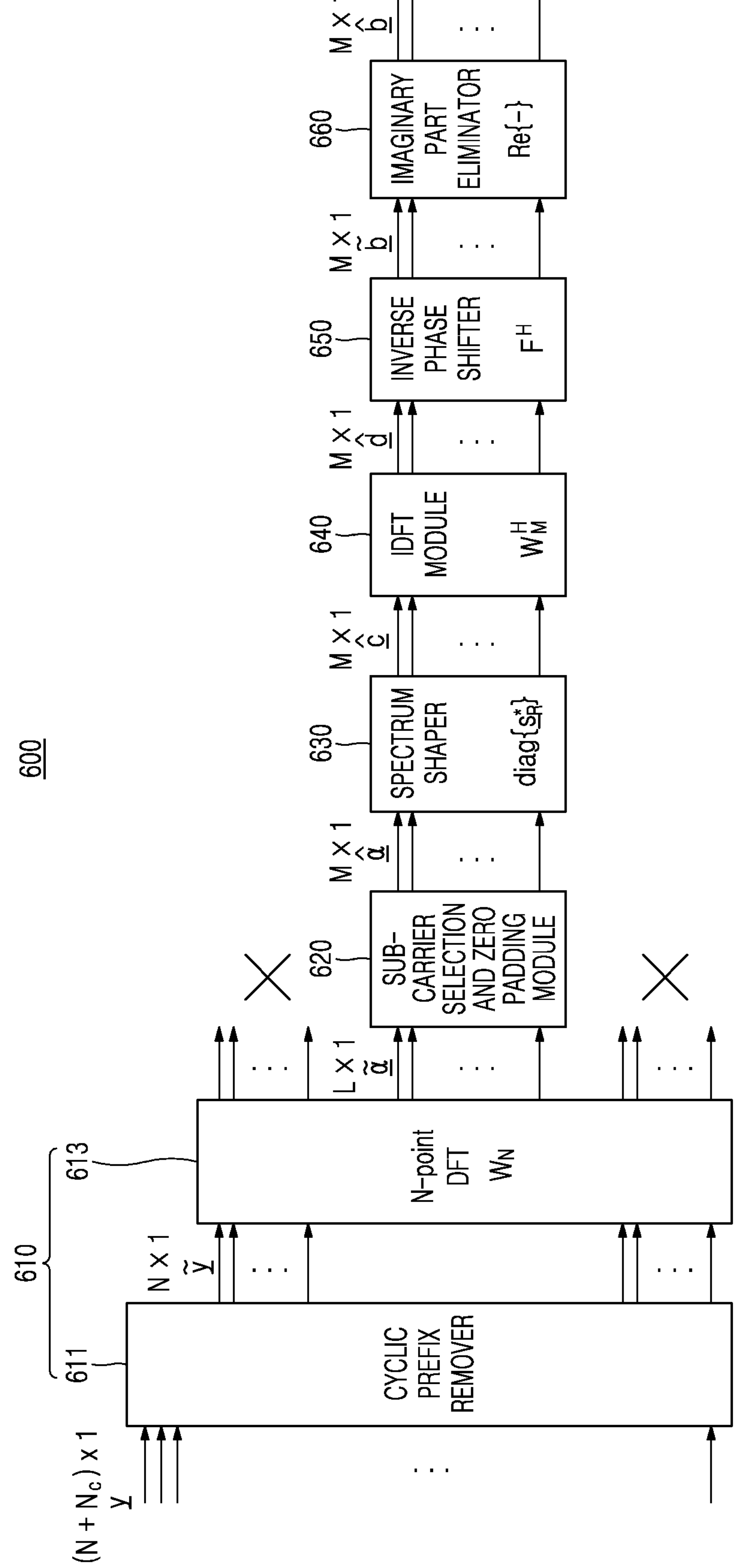
FIG. 6 is a block diagram illustrating a configuration of a DFT-spread OFDM receiver, according to an embodiment of the disclosure.

FIG. 6 is a block diagram illustrating a configuration of a DFT-spread OFDM receiver, according to an embodiment of the disclosure.

Referring to FIG. 6, a DFT-spread OFDM receiver 600 according to an embodiment of the disclosure may include a frequency domain receive signal generator 610, a sub-carrier selection and zero padding module 620, a frequency domain receive spectrum shaper 630, an IDFT module 640, an inverse phase shifter 650 and an imaginary part eliminator 660.

The frequency domain receive signal generator 610 includes a cyclic prefix remover 611 and an N-point DFT module 613. The cyclic prefix remover 611 generates a vector ỹ with the cyclic prefix removed therefrom by receiving a signal y that has passed through a channel and removing the cyclic prefix from the signal y, and the N-point DFT module 613 generates a frequency domain receive vector by performing N-point DFT on the vector ỹ with the cyclic prefix removed therefrom. Operations of the cyclic prefix remover 611 and the N-point DFT module 613 are widely known technologies in the art to which the disclosure belongs, so the description thereof will be omitted in the specification.

The sub-carrier selection and zero padding module 620 generates a vector â having a length of M by generating and zero-padding a vector ã which selects parts corresponding to L sub-carriers in an allocated frequency range from among the frequency domain receive vector. Assuming hereinafter that first L sub-carriers are allocated, vector ã may be defined by equation 5:

$$\underline{\tilde{a}} \triangleq [\, I_L \quad 0_{L\times(N-L)}] W_N \underline{\tilde{y}} \quad \text{[Equation 5]}$$

where $I_L$ is an L×L unit matrix, and $O_{L\times(N-L)}$ is an L×(N−L) zero matrix.

For example, the zero padding may be performed by adding (M−L+1)/2 zeros in front of the vector ã and adding (M−L−1)/2 zeros behind, in which case the vector â may be defined by equation 6:

$$\underline{\hat{a}} \triangleq \begin{bmatrix} 0_{\frac{M-L+1}{2}\times 1} \\ \underline{\tilde{a}} \\ 0_{\frac{M-L-1}{2}\times 1} \end{bmatrix} \quad \text{[Equation 6]}$$

where $$0_{\frac{M-L+1}{2}\times 1}$$

is an (M−L+1)/2×1 zero vector, and $$0_{\frac{M-L-1}{2}\times 1}$$

is an (M−L−1)/2×1 zero vector.

The frequency domain receive spectrum shaper 630 generates a frequency domain receive spectrum shaped vector ĉ by performing Hadamard product of the zero-padded vector â and a conjugate complex vector of a receive shaping vector $s_R$. The receive shaping vector $s_R$ may be same as the first shaping vector $s_T$, or may be same as the third shaping vector $s_{T3}$ generated by performing Hadamard product of the first shaping vector $s_T$ and a channel equalization vector v.

The IDFT module 640 generates a de-spread vector d̂ by multiplying the frequency domain receive spectrum shaped vector ĉ by a transverse DFT matrix $$W_M^H.$$

The inverse phase shifter 650 generates an inverse-phase-shifted vector b̃ by multiplying the de-spread vector d̂ by a transverse phase shift matrix $F^H$.

The imaginary part eliminator 660 generates a vector b̂ from which imaginary part interference and noise is eliminated by taking real parts of the inverse-phase-shifted vector b̃. Accordingly, an estimated value b̂ of the PAM symbol vector may be expressed as in equation 7:

$$\underline{\hat{b}} = \mathrm{Re}\left[F^H W_M^H \mathrm{diag}\{\underline{s}_R^*\}\underline{\hat{a}}\right] \quad \text{[Equation 7]}$$

where $s_R$ is an M×1 receive shaping vector, and superscript * refers to transform into a conjugate complex vector.

Figure 7:
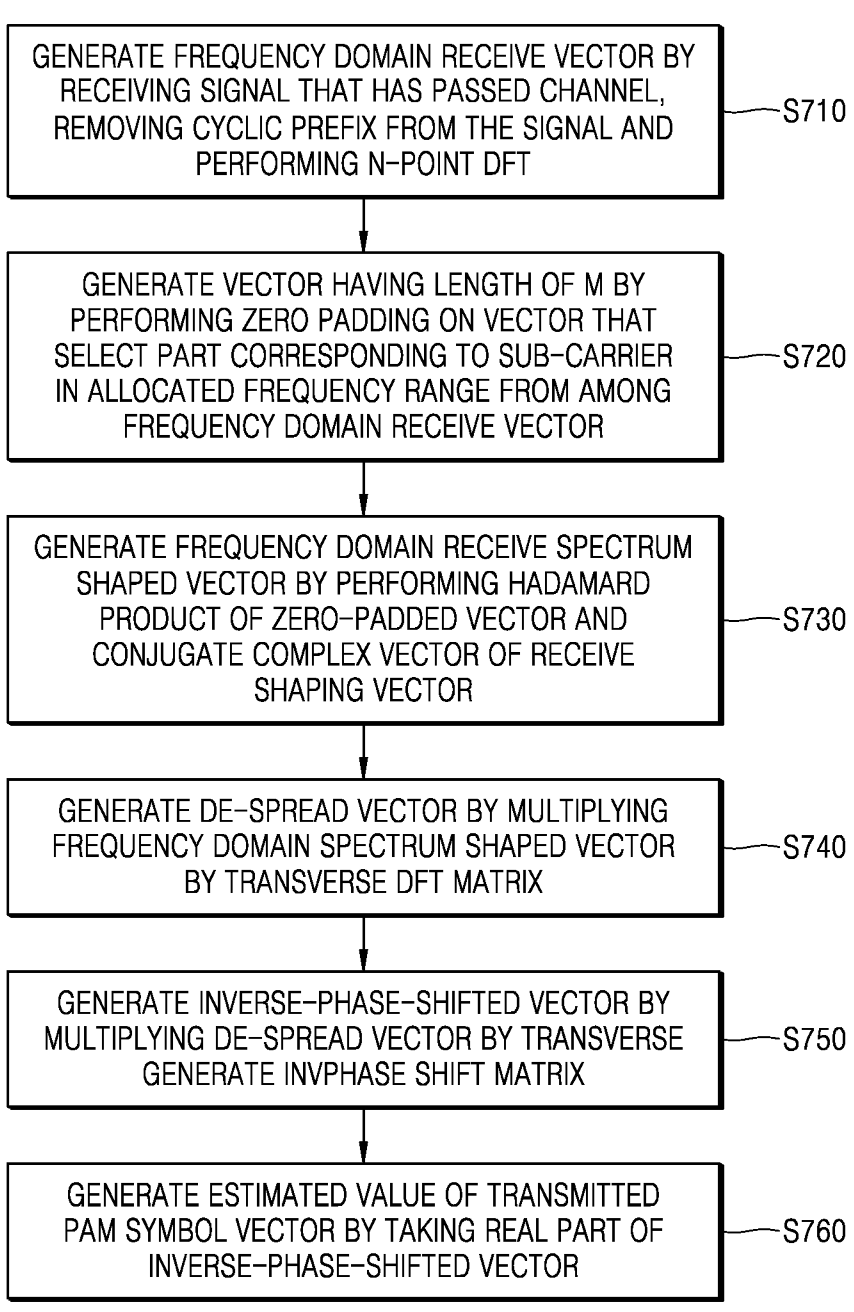
FIG. 7 is a flowchart of a DFT-spread OFDM reception method, according to an embodiment of the disclosure.

FIG. 7 is a flowchart of a DFT-spread OFDM reception method, according to an embodiment of the disclosure.

The DFT-spread OFDM reception method according to an embodiment of the disclosure may be performed by the DFT-spread OFDM receiver 600 of FIG. 6.

Referring to FIG. 7, in operation 710, a vector ỹ with the cyclic prefix removed therefrom is generated by receiving a signal y that has passed through a channel and removing the cyclic prefix from the signal y, and a frequency domain receive vector is generated by performing N-point DFT on the vector ỹ with the cyclic prefix removed therefrom.

In operation S720, a vector â having a length of M is generated by generating and zero-padding a vector ã which selects parts corresponding to sub-carriers in an allocated frequency range from among the frequency domain receive vector. When first L sub-carriers are allocated, vector ã may be defined by equation 5. The zero padding may be performed by adding (M−L+1)/2 zeros in front of the vector ã and adding (M−L−1)/2 zeros behind, in which case the vector â may be defined by equation 6.

In operation S730, a frequency domain receive spectrum shaped vector ĉ is generated by performing Hadamard product of the zero-padded vector â and a conjugate complex vector of a receive shaping vector $s_R$.

The receive shaping vector $s_R$ may be selected to correspond to the first shaping vector $s_T$, or selected to correspond to the third shaping vector $s_{T3}$ generated by performing Hadamard product of the first shaping vector $s_T$ and a channel equalization vector v.

In operation S740, a de-spread vector d̂ is generated by multiplying the frequency domain receive spectrum shaped vector ĉ by a transverse DFT matrix $$W_M^H.$$

In operation S750, an inverse-phase-shifted vector b̃ is generated by multiplying the de-spread vector d̂ by a transverse phase shift matrix $F^H$.

In operation S760, a vector b̂ from which imaginary part interference and noise is eliminated by taking real parts of the inverse-phase-shifted vector b̃. Accordingly, an estimated value b̂ of the PAM symbol vector may be expressed as in equation 7.

Figure 8:
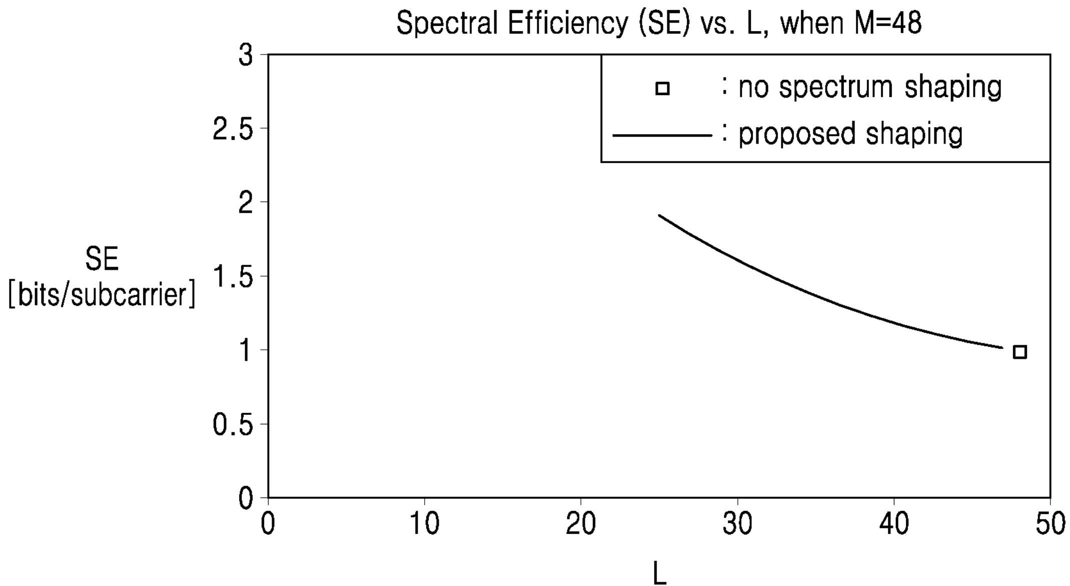
FIG. 8 is a graph representing spectral efficiency according to the number of binary phase shift keying (BPSK) symbols transmitted at a fixed number of sub-carriers.

FIG. 8 is a graph representing spectral efficiency according to the number M of pi/2 BPSKsymbols transmitted at a fixed number of sub-carriers. The spectral efficiency (SE) may be expressed as in the following equation 8:

$$SE = \frac{M}{L}[\text{bits/subcarrier}] \quad \text{[Equation 8]}$$

FIG. 8 illustrates spectral efficiency at a time of transition in number of allocated sub-carriers to L=25~47 when M (M=48) pi/2 BPSK symbols are transmitted. According to FIG. 8, when L=25~47, the first shaping vector according to embodiments of the disclosure has higher spectral efficiency than when spectrum shaping is not performed, and when L is reduced to 25, it has almost double the spectral efficiency of when spectrum shaping is not performed.

Figure 9:
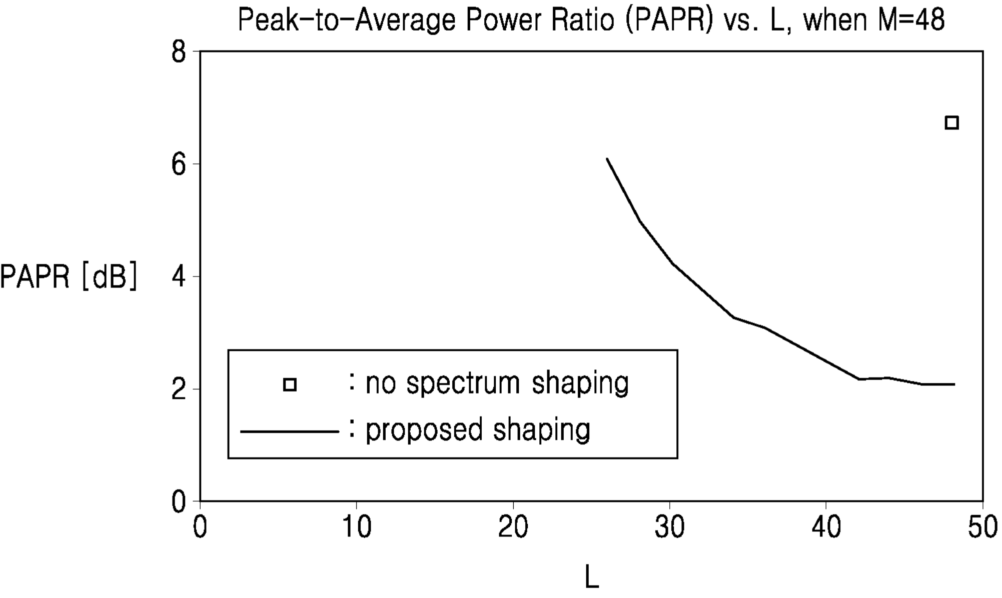
FIG. 9 is a graph representing peak to average power ratio (PAPR) performance according to the number of BPSK symbols transmitted at a fixed number of sub-carriers.

FIG. 9 is a graph representing PAPR performance at a time of transition in number of allocated sub-carriers to L=25~47 when M (M=48) pi/2 BPSK symbols are transmitted. According to FIG. 9, when L=25~47, the first shaping vector according to embodiments of the disclosure has a lower PAPR than when spectrum shaping is not performed, and even when L is reduced to 25 to almost double the spectral efficiency, it still attains lower PAPR performance.

Accordingly, with the shaping vector according to embodiments of the disclosure, the PAPR performance may be easily traded off for the spectral efficiency.

Although the disclosure is described with reference to accompanying drawings and embodiments, the scope of the disclosure is not limited thereto, and those of ordinary skill in the art may appreciate that various modifications and changes to the disclosure can be made without deviating from the idea and scope of the appended claims below.

DESCRIPTION OF THE NUMERALS

100: DFT-spread OFDM transmitter
110: phase shifter

120: DFT spreader
130: frequency domain spectrum shaper
140: sub-carrier allocator
150: signal generator
151: N-point IDFT module
153: cyclic prefix adder
600: DFT-spread OFDM receiver
610: frequency domain receive signal generator
611: cyclic prefix remover
613: N-point DFT module
620: sub-carrier selection and zero padding module
630: frequency domain receive spectrum shaper
640: IDFT module
650: inverse phase shifter
660: imaginary part eliminator

The invention claimed is:

1. A discrete Fourier transform (DFT)-spread orthogonal frequency division multiplexing (OFDM) transmitter comprising:

a phase shifter configured to generate a pi/2 pulse amplitude modulation (PAM) symbol vector d by phase-shifting a symbol vector b including M PAM symbols;

a DFT spreader configured to generate a DFT-spread pi/2 PAM symbol vector c by spreading the pi/2 PAM symbol vector d by using an M-point DFT matrix $W_M$;

a frequency domain spectrum shaper configured to generate a frequency domain spectrum shaped pi/2 PAM symbol vector a by multiplying each element of the DFT-spread pi/2 PAM symbol vector c by each element of a first shaping vector $s_T$ including one or more zero (0) elements; and a sub-carrier allocator configured to allocate a non-zero element in the frequency domain spectrum shaped pi/2 PAM symbol vector a to a sub-carrier in an allocated frequency range.

2. The DFT-spread OFDM transmitter of claim 1, wherein the frequency domain spectrum shaper is configured to generate the frequency domain spectrum shaped pi/2 PAM symbol vector a by obtaining Hadamard product of the DFT-spread pi/2 PAM symbol vector c and the first shaping vector $s_T$, wherein the first shaping vector $s_T$ is determined according to M and a number L of the subcarriers to be used.

3. The DFT-spread OFDM transmitter of claim 2, wherein an m-th element of the first shaping vector $s_T$ is defined by the following equation:

$$s_{T,m} \triangleq \begin{cases} 0, & \text{for } 1 \le m \le \frac{M-L+1}{2}, \\ \sqrt{2}\sin\left(\frac{\pi\left(m-\frac{M-L+1}{2}\right)}{2L-M+2}\right), & \text{for } \frac{M-L+1}{2} < m \le \frac{L+1}{2}, \\ \sqrt{2}, & \text{for } \frac{L+3}{2} \le m \le \frac{2M-L+1}{2}, \\ \sqrt{2}\cos\left(\frac{\pi\left(m-\frac{2M-L+1}{2}\right)}{2L-M+2}\right), & \text{for } \frac{2M-L+1}{2} < m \le \frac{M+L+1}{2}, \\ 0, & \text{for } \frac{M+L+1}{2} < m \le M, \end{cases}$$

where m=1, 2, . . . , M, M is an even number, L is an odd number, and M/2<L<M.

4. The DFT-spread OFDM transmitter of claim 1, wherein the frequency domain spectrum shaper is configured to perform frequency domain spectrum shaping with a second shaping vector $s_{T2}$ generated by performing Hadamard product of the first shaping vector $s_T$ and a window vector w of one of Hamming, Hanning, Keiser, Gaussian, Tukey, Blackmann and Dolph-Chebyshev.

5. A discrete Fourier transform (DFT)-spread orthogonal frequency division multiplexing (OFDM) transmission method performed by a DFT-spread OFDM transmitter, the DFT-spread OFDM transmission method comprising:

generating a pi/2 pulse amplitude modulation (PAM) symbol vector d by phase-shifting a symbol vector b including M PAM symbols;

generating a DFT-spread pi/2 PAM symbol vector c by spreading the pi/2 PAM symbol vector d by using an M-point DFT matrix $W_M$;

generating a frequency domain spectrum shaped pi/2 PAM symbol vector a by multiplying each element of the DFT-spread pi/2 PAM symbol vector c by each element of a first shaping vector $s_T$ including one or more zero (0) elements; and allocating a non-zero element in the frequency domain spectrum shaped pi/2 PAM symbol vector a to a sub-carrier in an allocated frequency range.

6. The DFT-spread OFDM transmission method of claim 5, wherein the generating of the frequency domain spectrum shaped pi/2 PAM symbol vector a comprises generating the frequency domain spectrum shaped pi/2 PAM symbol vector a by performing Hadamard product of the DFT-spread pi/2 PAM symbol vector c and the first shaping vector $s_T$, wherein the first shaping vector $s_T$ is determined according to M and a number L of the sub-carriers to be used.

7. The DFT-spread OFDM transmission method of claim 6, wherein an m-th element of the first shaping vector $s_T$ is defined by the following equation:

$$s_{T,m} \triangleq \begin{cases} 0, & \text{for } 1 \le m \le \frac{M-L+1}{2}, \\ \sqrt{2}\sin\left(\frac{\pi\left(m-\frac{M-L+1}{2}\right)}{2L-M+2}\right), & \text{for } \frac{M-L+1}{2} < m \le \frac{L+1}{2}, \\ \sqrt{2}, & \text{for } \frac{L+3}{2} \le m \le \frac{2M-L+1}{2}, \\ \sqrt{2}\cos\left(\frac{\pi\left(m-\frac{2M-L+1}{2}\right)}{2L-M+2}\right), & \text{for } \frac{2M-L+1}{2} < m \le \frac{M+L+1}{2}, \\ 0, & \text{for } \frac{M+L+1}{2} < m \le M, \end{cases}$$

where m=1, 2, . . . , M, M is an even number, L is an odd number, and M/2<L<M.

8. The DFT-spread OFDM transmission method of claim 5, wherein the generating of the frequency domain spectrum shaped pi/2 PAM symbol vector a comprises performing frequency domain spectrum shaping with a second shaping vector $s_{T2}$ generated by performing Hadamard product of the first shaping vector $s_T$ and a window vector w of one of Hamming, Hanning, Keiser, Gaussian, Tukey, Blackmann and Dolph-Chebyshev.

9. A discrete Fourier transform (DFT)-spread orthogonal frequency division multiplexing (OFDM) receiver comprising:

a frequency domain receive signal generator configured to generate a vector $\tilde{y}$ with cyclic prefix (CP) removed therefrom by receiving a signal y which has passed through a channel and removing the CP from the signal y, and generate a frequency domain receive vector by performing N-point DFT on the vector $\tilde{y}$ with CP removed therefrom;

a sub-carrier selection and zero padding module configured to generate a vector $\hat{a}$ having a length of M by generating and zero-padding a vector $\tilde{a}$ which selects parts corresponding to L sub-carriers in an allocated frequency range from among the frequency domain receive vector;

a frequency domain receive spectrum shaper configured to generate a frequency domain receive spectrum shaped vector $\hat{c}$ having a length of M by performing Hadamard product of the zero-padded vector $\hat{a}$ and a conjugate complex vector of a receive shaping vector $s_R$;

an inverse DFT (IDFT) module configured to generate a de-spread vector $\hat{d}$ by multiplying the frequency domain receive spectrum shaped vector $\hat{c}$ by a transverse DFT matrix $$W_M^H,$$

an inverse phase shifter configured to generate an inverse-phase-shifted vector $\tilde{b}$ by multiplying the de-spread vector $\hat{d}$ by a transverse phase shift matrix $F^H$; and an imaginary part eliminator configured to generate an estimated value $\hat{b}$ of a transmitted PAM symbol vector by taking real parts of the inverse-phase-shifted vector $\tilde{b}$.

10. The DFT-spread OFDM receiver of claim 9, wherein the zero padding is performed by adding (M−L+1)/2 zeros (0's) in front of the vector $\tilde{a}$ and (M−L−1)/2 zeros behind.

11. The DFT-spread OFDM receiver of claim 9, wherein the frequency domain receive spectrum shaper is configured to perform frequency domain receive spectrum shaping by using a third shaping vector $s_{T3}$ generated by performing Hadamard product of a first shaping vector $s_T$ including one or more zero elements and a channel equalization vector v.

12. A discrete Fourier transform (DFT)-spread orthogonal frequency division multiplexing (OFDM) reception method performed by a DFT-spread OFDM receiver, the DFT-spread OFDM reception method comprising:

generating a vector $\tilde{y}$ with cyclic prefix (CP) removed therefrom by receiving a signal y which has passed through a channel and removing the CP from the signal y, and generating a frequency domain receive vector by performing N-point DFT on the vector $\tilde{y}$ with CP removed therefrom;

generating $\hat{a}$ vector a having a length of M by generating and zero-padding $\tilde{a}$ vector which selects parts corresponding to L sub-carriers in an allocated frequency range from among the frequency domain receive vector;

generating a frequency domain receive spectrum shaped vector $\hat{c}$ having a length of M by performing Hadamard product of the zero-padded vector $\hat{a}$ and a conjugate complex vector of a receive shaping vector $s_R$;

generating a de-spread vector $\hat{d}$ by multiplying the frequency domain receive spectrum shaped vector $\hat{c}$ by a transverse DFT matrix $$W_M^H;$$

generating an inverse-phase-shifted vector $\tilde{b}$ by multiplying the de-spread vector $\hat{d}$ by a transverse phase shift matrix; and generating an estimated value $\hat{b}$ of a transmitted PAM symbol vector by taking real parts of the inverse-phase-shifted vector $\tilde{b}$.

13. The DFT-spread OFDM reception method of claim 12, wherein the zero padding is performed by adding (M−L+1)/2 zeros (0's) in front of the vector $\tilde{a}$ and (M−L−1)/2 zeros behind.

14. The DFT-spread OFDM reception method of claim 12, wherein the generating of the frequency domain receive spectrum shaped vector $\hat{c}$ comprises performing frequency domain receive spectrum shaping by using a third shaping vector $s_{T3}$ generated by performing Hadamard product of a first shaping vector $s_T$ including one or more zero elements and a channel equalization vector v.

* * * * *